April 18, 1944.    J. CRAWFORD ET AL    2,346,732
VIBRATION DAMPER
Filed Sept. 20, 1941

J. Crawford
G. M. Wiegand
INVENTORS

BY E. C. McRae and
Robert G. Harris
ATTORNEYS.

Patented Apr. 18, 1944

2,346,732

UNITED STATES PATENT OFFICE 2,346,732

VIBRATION DAMPER

John Crawford, Detroit, and Gene M. Wiegand, Dearborn, Mich., assignors to Ford Motor Company, Dearborn, Mich., a corporation of Delaware Application September 20, 1941, Serial No. 411,632

2 Claims. (Cl. 74—574)

This invention relates to the construction of vibration dampers; and more particularly, to an inertia member or flywheel to be used with an internal-combustion engine or the like which incorporates means to damp and counteract the vibrations usually found therein.

As a specific example of the invention, a flywheel is shown of the type generally used in conjunction with an internal-combustion engine and which has applied thereto means by which both the torsional and transverse vibrations of the engine crankshaft may be eliminated insofar as their effect on the engine itself or the mechanism connected thereto is concerned.

This member is referred to herein as a flexible flywheel as it incorporates certain flexible connections which co-operate not only to perform the usual functions of an inertia member, but to act as vibration damping means as well.

An advantage of this invention is that by it an effective torsional and transverse vibration damper is incorporated in the usual construction of a flywheel. A further advantage is that the elements which give this effect are, in large part, those which are conventionally found in the flywheel construction. Another advantage is that the flexible feature is obtained by using a minimum of additional parts, none of which is complex or difficult to manufacture. Another advantage is that the assembly of this flexible flywheel presents no particular difficulties. Yet another advantage is that the flywheel construction, per se, is not weakened by the inclusion of the flexible feature.

In the conventional internal-combustion engine, the crankshaft is supported in a number of axial bearings adjacent each end and intermediate the throws; and the flywheel is rigidly attached to the rear end of the shaft. During operation, the forces imposed cause an appreciable deflection of the shaft journals in their bearings. Thus the axes of the journals, when rotating, are bent out of alignment with the axes of the bearings. The flywheel tends to rotate around a fixed axis, due to its gyroscopic effect, so that when the flywheel is fixed to one end of the shaft and the unit rotated at high speed, the forces causing the shaft to bend are transmitted to the flywheel, thereby setting up vibration in the engine.

It is the object of this invention to provide a flywheel having sufficient inertia to equalize torque impulses from the crankshaft but which will not be deflected or wobbled out of its true path of rotation by deflection of the crankshaft.

A further object of our invention is to provide frictional means for dampening this flexible connection between the shaft and the flywheel so that the energy represented by the vibratory deflections of the shaft may be dissipated as heat.

Still a further object of our invention is to arrange the above-mentioned frictional damper so that it will also dissipate as heat the energy represented by the torsional vibrations of the shaft. These vibrations are due to the windup of the shaft when a power impulse is received and to the unwinding thereof during the compression stroke of the engine. In our improved construction a single friction dampening means functions to dampen both of these independent vibrations.

To summarize, our flywheel is resiliently connected to the crankshaft so the shaft may wobble without forcing the flywheel from its natural path of rotation. This resilient connection also permits the shaft to accelerate and decelerate a small amount relative to the flywheel. The friction damper functions to absorb the energy represented both by the above-described wobble of the shaft and by the torsional vibrations thereof.

With these and other objects in view, our invention consists of the arrangement, construction and combination of the various parts of our improved device, as described in this specification, claimed in the claims and illustrated in the accompanying drawing, in which:

Figure 1:
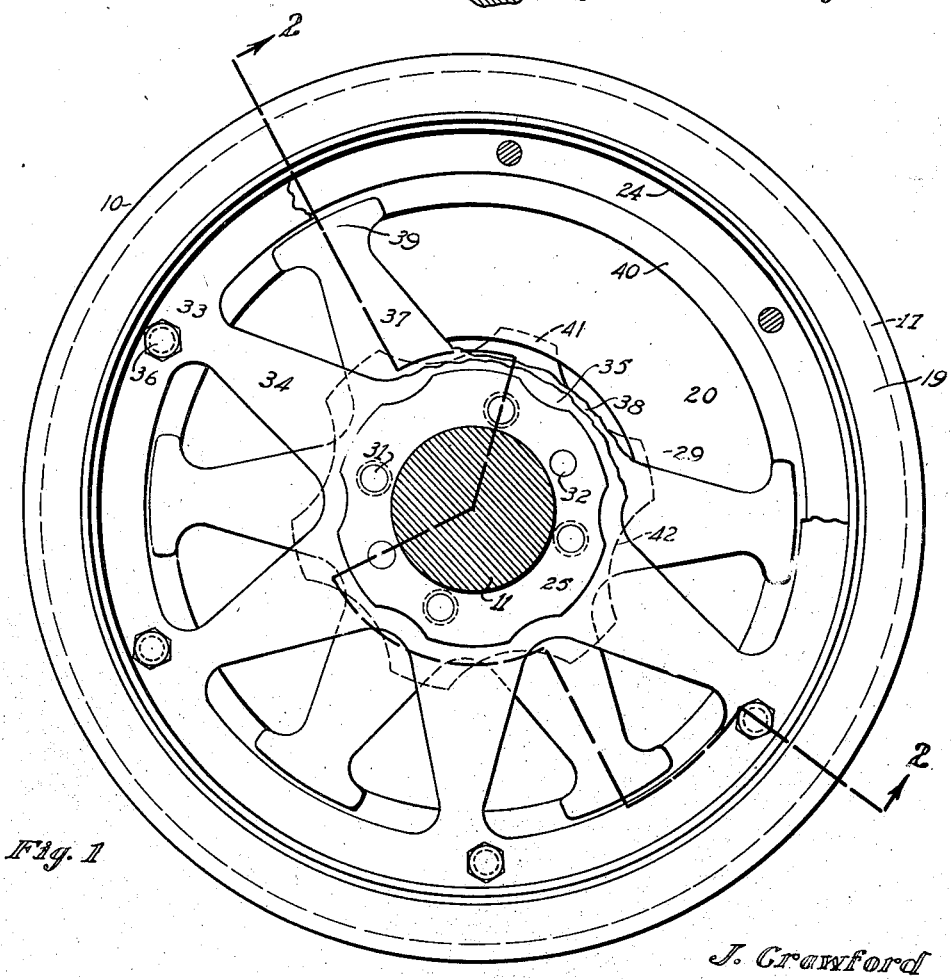
Figure 1 is an elevation of a flywheel incorporating the invention.

Referring to Figure 1, a flywheel 10 of the type generally used in conjunction with an internal-combustion engine is shown. This is attached, by means which will be described more fully later, to the rear end of the engine crankshaft 11. The rear end of the shaft is also drilled as at 12 and the forward end 13 of the clutch transmission shaft 14 is piloted therein. The hub 15 of a clutch plate is attached to shaft 14. In the conventional crankshaft and clutch construction a clutch plate would ordinarily be attached thereto and would carry a friction disc which engages the outer face 16 of the flywheel. This clutch construction is not shown in detail in the drawing since it is of the conventional design usually incorporated in this type of construction. Also conventional is the starter ring gear 17 on the rim of the flywheel which is engaged by the starter gear to rotate the flywheel and crankshaft when it is desired to start the engine.

Figure 2:
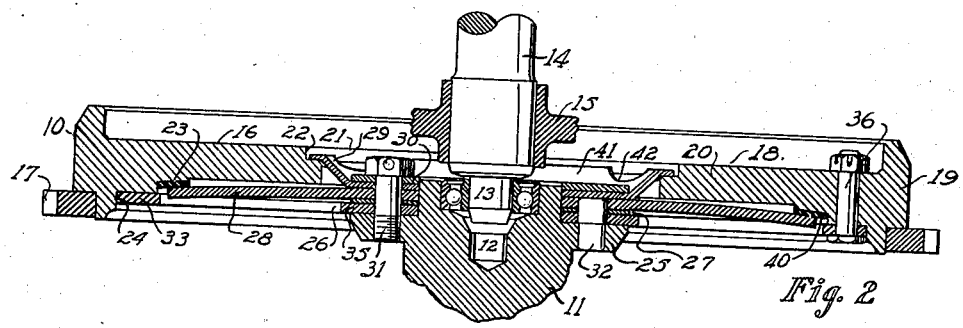
Figure 2 is a section thereof taken on the line 2—2 of Figure 1.

Referring now to Figure 2, the construction of the flywheel itself is shown in detail. In this design the flywheel is composed of a heavy ring 18 which consists of a peripheral edge 19 and a web 20 having a central aperture 21. The rear surface of the web is recessed as at 22 about the aperture 21, while the front face has a chamfered friction surface 23 and a circular rabbet 24.

The rear end of the crankshaft 11 is enlarged to form a flange 25. Secured to this flange in the following order are: A drive plate 26, a spacer 27, a friction spider 28, and a retainer assembly 29, all of which are attached to the flange 25 by bolts 31. In addition, the drive plate 26 and the friction spider 28 are secured to the flange by dowels 32.

The drive plate 26 is formed as a disc of relatively thin steel which is cut away, as best shown in Figure 1, to provide a peripheral rim 33, a plurality of radial spokes 34 and a hub 35. The rim 33 fits within the rabbet 24 and is secured to the ring 18 of the flywheel by a plurality of rim bolts 36. It is apparent that this plate provides the driving connection between the crankshaft 11 and the flywheel.

This plate is purposely formed of thin sheet steel so that its rim may freely follow the true path described by normal rotation of the flywheel, while its central or hub portion may freely wobble in accordance with the wobbling movement of the end of the crankshaft. The thin spokes permit such movement. Each spoke bends back and forth in an axial direction through one cycle for each revolution. To uniformly stress the material of the spokes they are designed as cantilever beams. Thus more material is present at the inside end of each spoke where the bending stresses are highest.

A further result of shaping the spokes as cantilever beams is that such design permits a limited torsional flexibility between the shaft and the flywheel while still maintaining these elements concentric with each other. It will, of course, be realized that the lateral flexibility permitted is many times the maximum torsional flexibility. The thickness of the plate determines the lateral flexibility, while the width of the spoke determines the torsional flexibility. Each of these is calculated so that friction dampening means is effective to reduce the resultant vibrations.

A dampener spider 28 is formed of a sheet metal disc having cut away portions to form a number of radial arms 37 which extend from a hub 38. The rim of this disc, however, is discontinuous and each radial arm 37 is terminated by a pad 39. The metal of the arms 37 is the same thickness as the driving plate arms so that the friction pads may follow the plane of the flywheel while the hub follows the crankshaft in like manner to the driving plate. However, the arms 37 are considerably wider than the driving spokes 34 so that their circumferential or torsional resiliency is practically nil. The pads 39 thus may be considered as rigidly fixed to the shaft, while the flywheel against which the pads bear is resiliently fixed to the shaft. Thus relative circumferential movement between the pads and flywheel occurs upon normal operation of the engine. The pads 39 at the end of the friction spider arms 37 bear against a continuous friction facing ring 40, which is loosely disposed in the chamfer 23, previously described, and held in place by the pads.

From the foregoing it will be seen that lateral or wobbling movement of the shaft relative to the flywheel will cause the arms to successively move radially in and out upon the ring 40. As the flywheel is fixed to the driving plate rim, no relative movement can occur at this point. Consequently, all of the play, due to this wobbling motion, must occur between the ring 40 and the pads 39. The friction so developed tends to damp out resonance vibrations due to this primary vibration.

While both the drive plate and the friction spider plate are of the same gage steel, the relative positions of the flywheel, flange 25 and the hub 15 are so arranged that, when assembled, the drive plate assumes a flat position, while the friction spider is forced from its original conformation to the dished position shown in the drawings. The retainer 29 is formed of somewhat thinner metal than the plate or spider; and, as shown by the dotted line in Figure 1, has a number of peripheral indentations 42 forming the projecting teeth 41. These teeth bear against the rear face 16 of the flywheel in the recess 22 and permit a limited flexibility of the wheel in a direction rearwardly of the engine. The retainer is reinforced by the plate 30 which, for convenience in assembly, may be spot-welded to it.

As shown in Figure 2, the drive plate 26 is flat in normal position, the friction spider is elastically deformed and the axial equilibrium of the flywheel rim is maintained by the resilient engagement of the friction spider and the retainer on its opposite sides. When the flywheel is rotating, transverse vibrations or wobble of the shaft will not affect the longitudinal position of its rim due to the inherent elasticity of the means connecting the rim to the shaft. Thus we avoid entirely the effect resulting when an oblique shaft is biased by the gyroscopic action of the flywheel.

We wish to emphasize particularly this interaction between the several elements of the structure by means of which the torsional elements complement those designed to permit axial movement and vice versa. In addition, the frictional engagement and elasticity of the plates connecting the flywheel with the shaft insure that torsional, axial and transverse vibrations of the crankshaft will be damped and will not be transmitted to the transmission shaft, nor will they cumulatively affect the engine or flywheel.

Heretofore, various expedients have been devised to obtain the recognized advantages of such a flexible flywheel. Most of these have been cumbersome, employed a large number of parts, been difficult to assemble, developed frictional or squeaking noises and have not been satisfactory as a practical installation. By contrast, our flywheel requires, in addition to the web or drive plate 26, but one large friction plate and a small retainer unit 29. Only one extended friction surface is required, as represented by the friction ring 40, and the co-operating surfaces on the flexible plate, as represented by the pads 39, require no special treatment or processing. It will benoted that none of the flexible elements 26, 28 or 29 are in sliding engagement with each other. Their hub portions, of course, are fixed and the only peripheral sliding movement of any magnitude is between the spider and the wheel rim through the interposed friction ring 40. There is thus no opportunity for squeaks or noises to develop.

A prime advantage of the construction is that the principal plates may be stamped from flat stock and, before assembly, are flat surfaces. This is important from a production standpoint.

since it is found that large flexible plates which have to be dished or bowed before assembly to obtain flexibility are not only expensive to manufacture but it is almost impossible to maintain any degree of uniformity therein, particularly when they are made from spring steel. This difficulty is avoided here by using the plates in their flat form and depending upon the spacing and the drawing up by the assembly bolts to obtain the desired curved position and place the flywheel under the requisite resisting forces. This difficulty does not apply to the retainer 29, since it is of small diameter and is dished purely for structural reasons and not to obtain flexibility which follows from the toothed edge used.

A further safety factor is inherent in the friction spider and retainer assembly. Both, it will be noted, are seated within counterbores in the opposite walls of the flywheel. However, the diameters of these two elements are so chosen that the circumferential clearance of the retainer is less than that of the spider. In the event that the drive plate should fail in operation, the flywheel rim will still be secured, piloting axially on the retainer and maintained longitudinally between the spider and retainer. Inasmuch as the retainer is somewhat more rigid than the spider, it is preferable that this piloting action should be borne by it, rather than by the latter.

A flexible flywheel constructed according to this disclosure will be found to have superior characteristics as a vibration damper and eliminator. The construction is such that it is available at very low additional cost and it is found that in actual use it does not develop noise or require any particular attention. It may be produced readily and cheaply; and its assembly offers no difficulties because of the features of design pointed out in detail.

Some changes may be made in the arrangement, construction and combination of the various parts of this improved construction without departing from the spirit of our invention and it is our intention to cover by the claims such changes as may reasonably be included within the scope thereof.

We claim as our invention:

1. In combination, in a vibration damper, having a central hub portion, an annular rim, and flexible connections between said hub and said rim comprising, a normally flat driving plate of metal secured at its outer edge to said rim and at its inner edge to said hub, said driving plate being formed with cutaway sections to provide a continuous peripheral ring and a plurality of radially-extending arms thereto, an initially flat flexible plate of metal having its central portion secured to said hub and its outer portion resiliently engaging one face of said rim, said friction plate having cut-away portions to form a plurality of outwardly extending radial arms having discontinuous braking surfaces at the outer ends thereof, a retainer having its central portion secured to said hub and its outer portion resiliently engaging the other face of said rim, and means securing said plates and said retainer to said hub, said elements being so constructed that when said securing means is tightened, said flexible plate is bent from its normally flat position and resilient forces are imposed thereby on said rim, said arms on said driving plate and said flexible plate being alternately arranged whereby said arms on said flexible plate are free of connection with said arms on said driving plate.

2. In combination, in a vibration damper, having a central hub portion, a heavy annular rim, and flexible connection between said hub and said rim, comprising, a thin, axially flexible metal driving plate having its outer edge secured to said rim and having a central portion secured to said shaft, an axially flexible metal damping plate having its central portion secured to said shaft and its outer portion frictionally and resiliently engaging one face of said rim, said driving plate and said damping plate being of substantially the same thickness, said driving plate being formed to have a continuous peripheral ring and a plurality of connecting spokes thereto, said flexible plate being formed to have a plurality of independently radially outwardly extending arms, said arms on said driving plate and said flexible plate being alternately arranged, and said arms on said flexible plate being free of connection with said arms on said driving plate, the minimum width of the arms of said damping plate exceeding the minimum width of the arms on said driving plate, and a retainer having a central portion secured to said shaft and its outer portion resiliently engaging the other face of said rim.

JOHN CRAWFORD.
GENE M. WIEGAND.